United States Patent Office 3,721,590
Patented Mar. 20, 1973

3,721,590
AMMONIUM PERCHLORATE WITH COCRYS-
TALLIZED OXALATE ANIONS
John Norman Maycock, Baltimore, Md., and Louis
Witten, Cincinnati, Ohio, assignors to Martin Marietta
Corporation, New York, N.Y.
No Drawing. Continuation-in-part of application Ser. No.
803,436, Feb. 28, 1969, which is a continuation-in-part
of application Ser. No. 589,185, Oct. 19, 1966, both
now abandoned. This application Nov. 20, 1969, Ser.
No. 878,588
Int. Cl. C06b 11/00
U.S. Cl. 149—76                                    2 Claims

ABSTRACT OF THE DISCLOSURE

The rate of thermal decomposition of certain high energy solid state materials, such as explosives and propellant oxidizers, may be either increased or decreased by doping to replace ions in the structure with ions having a different valence. Decomposition rate is increased if univalent anions are replaced with multivalent anions, and rate is conversely decreased if univalent cations are replaced with multivalent cations that are less colored than the host material.

This application is a continuation-in-part of my earlier filed application Ser. No. 803,436 filed Feb. 28, 1969, which is in turn a continuation-in-part of Ser. No. 589,185 filed Oct. 19, 1966, both now abandoned.

This invention relates to methods of altering the chemical reaction rates of materials, and to new materials obtained by such methods. More particularly, it relates to methods for altering the structure of existing high energy materials so that their chemical reaction rates may be either increased or decreased as desired. High energy materials for the purposes of this discussion are those that under appropriate conditions undergo substantial exoenergetic, usually exothermic, reactions. These include explosives, fuels, and propellant oxidizers.

The desirability of modifying the chemical reaction rates of such materials has long been recognized. Various applications of military and commercial explosives require different explosive characteristics and for years the chemical reaction rates of explosives have been adjusted to provide these characteristics. Reaction rate alterations have also been performed to render a high energy material suitable for entirely different applications. For instance, the chemical reaction rates of materials generally used as explosives have been slowed to create materials suitable for rocket propellants. The chemical reaction rates of both explosives and oxidizers have been both increased and decreased.

Prior art modifications of the chemical reaction rates of high energy materials generally suffer from one or more limitations. Such modifications has been usually accomplished by mechanical mixing of an additional ingredient or ingredients with the high energy materials. Such mixing has disadvantages. The additional ingredient, while providing the desired chemical reaction rate, may affect other characteristics of the material unfavorably. Also, high energy materials are often combined with binders and the like to form charges, or for other purposes, and the additives for altering reaction rates often react disadvantageously with these other materials. A trade-off must therefore be made between the advantages of reaction rate change and the concomitant degradation of other desirable characteristics. Further, it is difficult in such mechanical mixing to achieve the ultimate in uniform dispersion, and uneven reactions often result from the consequent inhomogeneity.

Prior art methods of modifying chemical reaction rates are generally quite specific: usually a particular additive will work with only one or a small, closely related group, of high energy materials. No overall approach has been developed that is usable for all or a large group of high energy materials, and that will permit the reaction rate to be increased or decreased, whichever is desired.

It is an object of this invention to provide a method of altering the chemical reaction rate of a large group of solid materials, including many high energy materials.

It is a further object of this invention to provide such a method that will permit the chemical reaction rate to be either increased or decreased, as desired, and that will result in smooth and even reactions.

It is still another object of this invention to provide certain high energy materials that have more desirable chemical reaction rates as a result of modification by this method.

We have discovered a method for altering the chemical reaction rate of a solid material containing point defects which is rich in at least one gaseous element and capable of thermally decomposing into completely gaseous products. Solid materials containing point defects include both materials in which the bonding is purely ionic and materials, such as lead azide, in which the bond is partly covalent and partly ionic.

These materials are comprised of anions and cations held in a regular lattice structure by ionic bonds or by a combination of ionic and covalent bonding. The materials that are amenable to the process of this invention may not all be normally considered as "crystals" when the word is used in its loose sense to describe a material having crystalline structure on a macro scale. Rather, the crystalline structure referred to is the basic structure of the material, and may exist only on a micro scale, as, for instance, when the material is powdered.

The point defects contained in these solids are ion vacancies; that is, positions in the crystalline structure that would normally be occupied by an anion or cation but which are in fact vacant. Such ion vacancies bear an effective charge of a polarity opposite to that of the ion that would occupy that site if the lattice structure were regular, or perfect. A cation vacancy would accordingly have an effective negative charge and an anion vacancy, an effective positive charge.

The chemical reactions of such materials may be complex in nature and the overall reaction may include a series of individual reactions. However, all chemical reactions of solids containing point defects are characterized by the loss of electrons by the anions, these electrons being subsequently captured by the vacant lattice sites that are created by anion vacancies and that form effective positive charges. The greater the number of anion vacancies in the material, the faster the rate of electron capture and the faster the rate of chemical reaction.

The chemical reaction rate may be increased by increasing the number of anion vacancies in the solid, or by decreasing the number of cation vacancies. An increase in the number of cation vacancies, or a decrease in the number of anion vacancies, will tend to slow down the chemical reaction and decrease the reaction rate.

The number of lattice site vacancies (point defects) may be adjusted by replacing some of the ions with ions having the same polarity but a different valence. Consider a solid composed of univalent anions and univalent cations. Suppose it is desired to increase the chemical reaction rate of the solid. As described above, this may be accomplished by increasing the number of anion lattice site vacancies. To do this, we replace some of the univalent anions in the lattice structure with anions having a greater valence, say divalent anions. Since the solid must remain electrically neutral, the additional charge incorporated by the divalent anions will be balanced by the loss of univalent anions; that is, by an increase in the number of anion vacancies in the lattice.

If some of the univalent cations are replaced with divalent cations that are less colored than the host material, that is, that absorb light at wavelengths shorter than the wavelengths at which the host material absorbs light, the number of cation vacancies increases and the chemical reaction rate is decreased.

Obviously, we are not limited to replacing univalent ions with divalent ions in order to alter the number of lattice site vacancies, although this type of substitution would be probably the most used. Univalent ions could also be replaced by ions having a valence greater than two. Also, in a solid composed of ions having a valence greater than one, some of the ions could be replaced by ions having a lower valence. This latter replacement would generally have an opposite effect on the reaction rate than replacement with ions having a greater valence. If divalent anions were replaced with univalent anions that are less colored than the host material, that is, that absorb light at wavelengths less than the wavelength at which the host material absorbs light, the number of anion vacancies would decrease, and the reaction rate would also decrease. And if divalent cations were replaced with univalent cations, the number of cation vacancies would decrease, and the reaction rate would increase.

In order to effect the ion replacement described, the original solid and a material containing the replacement ions may both be dissolved in a suitable solvent. Crystals obtained from the solution, as by cooling it, will then have the desired characteristics. The following examples describe in detail the operation of the process.

EXAMPLE 1

The chemical reaction rate of nitronium perchlorate ($NO_2ClO_4$) was decreased by the substitution of divalent strontium cations ($Sr^{++}$) for the univalent nitronium cations ($NO_2^+$) on approximately a $10^{-2}$ mole ratio. Ten grams of nitronium perchlorate ($NO_2ClO_4$) and 100 milligrams of strontium chloride ($SrCl_2$) were placed in 10 milliliters of undiluted nitric acid ($HNO_3$) at room temperature. The solution temperature was raised to 70° C., at which point all of the solids were dissolved in the solution. The solution was then permitted to cool to room temperature. The crystals that had precipitated were filtered off and dried for about 24 hours under a vacuum of about $10^{-4}$ mm. of Hg.

The chemical reaction rate of the crystals obtained by this process was compared with the reaction rate of pure nitronium perchlorate crystals by comparing the relative periods of time required for the pressure of oxygen ($O_2$) evolved from thermal decomposition to cover a specified pressure range when the materials thermally decomposed at a constant temperature and in a closed volume container. When the same weight of both materials was thermally decomposed in a closed volume of 1.3 liters at a constant temperature of 80° C., it required 1.2 minutes for the oxygen pressure resulting from pure nitronium perchlorate crystal decomposition to go from $0.01\mu$ to $0.25\mu$, while it required 7.5 minutes for the oxygen pressure from thermal decomposition of the crystals produced by this process to cover the same range under the same conditions.

EXAMPLE 2

The chemical reaction rate of nitronium perchlorate ($NO_2ClO_4$) was decreased by substituting divalent cations of calcium ($Ca^{++}$) for the univalent cations of nitronium ($NO_2^+$) on approximately a $10^{-2}$ mole ratio. The process was identical to that described in Example 1 except that 113 milligrams of calcium nitrate ($Ca(NO_3)_2$) was substituted for the strontium chloride of Example 1.

The rate of thermal decomposition of the resulting crystals was compared to the thermal decomposition rate of pure nitronium perchlorate crystals in the same manner as in Example 1. At a constant temperature of 120° C. and in a closed volume of 2.2 liters, 4.5 minutes were required for the oxygen ($O_2$) pressure resulting from the pure nitronium perchlorate decomposition to increase from $15\mu$ to $40\mu$, whereas 6.7 minutes were required to cover the same pressure range under the same conditions by the oxygen ($O_2$) evolved from decomposition of the crystals obtained from the process of this example. For the pressure range of $100\mu$ to $300\mu$ under the same conditions, 5.2 minutes were required by the oxygen ($O_2$) evolved from pure nitronium perchlorate and 11.2 minutes for the oxygen ($O_2$) evolved from the crystals of the process of this example.

EXAMPLE 3

The chemical reaction rate of nitronium perchlorate ($NO_2ClO_4$) was increased by the substitution of divalent sulfate anions ($SO_4^{--}$) for the univalent perchlorate anions ($ClO_4^-$) on approximately a $10^{-2}$ mole ratio. The process was identical to that of Examples 1 and 2 except that 91 milligrams of ammonium sulfate (($NH_4)_2SO_4$) was mixed with the 10 grams of nitronium perchlorate ($NO_2ClO_4$) in the 10 milliliters of undiluted nitric acid ($HNO_3$).

The rate of thermal decomposition of the crystals obtained by the process of this example was compared with the decomposition rate of pure nitronium perchlorate crystals in a manner similar to that of Examples 1 and 2. At the same constant temperature and in the same closed volume as in Example 2 (120° C. and 2.2 liters, respectively), the oxygen ($O_2$) evolved from the pure nitronium perchlorate crystals required (as in Example 2) 4.5 minutes to increase in pressure from $15\mu$ to $40\mu$ and 5.2 minutes to increase from $100\mu$ to $300\mu$. The oxygen evolved from the decomposition of the crystals produced by the process of this example, however, required only 3.0 minutes to increase in pressure from $15\mu$ to $40\mu$ and only 3.5 minutes to increase from $100\mu$ to $300\mu$.

EXAMPLE 4

The chemical reaction rate of ammonium perchlorate ($NH_4ClO_4$) was reduced by substituting divalent cations of calcium ($Ca^{++}$) for the univalent cations of ammonium ($NH_4^+$) on approximately a $10^{-2}$ mole ratio. Ten grams of ammonium perchlorate ($NH_4ClO_4$) and 100 milligrams of calcium nitrate ($Ca(NO_3)_2$) were placed in 25 milliliters of distilled water at room temperature. The temperature of the solution was raised to 90° C., at which point all of the solids were dissolved in the solution. The solution was then permitted to cool to room temperature. The crystals that had precipitated were filtered off and dried for about 24 hours under a vacuum of about $10^{-4}$ mm. of Hg. After vacuum drying, the crystals were heated in an oven maintained at between 110–130° C. for about four hours to remove any remaining water.

The rate of decomposition of the resulting crystals was compared to the rate of decomposition of pure ammonium perchlorate ($NH_4ClO_4$) crystals as in the previous examples, by comparing the length of time required for oxygen ($O_2$) evolved during decomposition to cover a prescribed range of pressures while maintained at a constant temperature. The decomposition rate is of course a function of temperature, and these comparisons were carried out at a number of temperatures. The results of the comparisons for two temperatures are set forth in the following table:

| Temperature (° C.) | Pressure range ($\mu$) | Time for $O_2$ from— | |
|---|---|---|---|
| | | Pure $NH_4ClO_4$ | Crystals of this process |
| 225 | 50–100 | 10 min | 24 min |
| 250 | 50–100 | 2 min | 4 min |

EXAMPLE 5

The chemical reaction rate of ammonium perchlorate ($NH_4ClO_4$) was increased by substituting divalent anions of sulfate ($SO_4^{--}$) for the univalent anions of perchlorate ($ClO_4^-$) in various ratios.

Laboratory grade ammonium perchlorate was dissolved in distilled water. A corresponding mole percentage of ammonium sulfate ($(NH_4)_2SO_4$) was placed in the solution. The solution temperature was raised to 70° C., at which point all of the solids were dissolved. The solution was then permitted to cool to room temperature. The crystalline precipitate was then filtered off and dried for about 24 hours under a vacuum of about $10^{-4}$ mm. of mercury. The dried crystals were then ground and passed through a 90–100 micron sieve.

The rate of thermal decomposition was not obtained, as in the previous examples, by measuring the rate of oxygen evolution, but by thermally decomposing 5 mg. of each of the samples in a Mettler Thermonanalyzer, which provides simultaneous thermogravimetric analysis (TGA) and differential thermal analysis (DTA) for each sample. The results of thermal decomposition of these samples of various mole percentages of ammonium sulfate are given in the table below:

| Mole percent $SO_4^{--}$ | Temp. (° C.) for— | |
|---|---|---|
| | 50% decomposition | 100% decomposition |
| 0 | 408 | 447 |
| $10^{-4}$ | 393 | 432 |
| $10^{-3}$ | 392 | 403 |

The incorporation of the divalent sulfate ions into the lattice markedly increases the rate of thermal decomposition as indicated by the lowered temperatures required for 50% and 100% decomposition.

EXAMPLE 6

Ammonium oxalate ($(NH_4)_2(COO)_2$) was used to introduce $10^{-1}$ mole percent of doubly valent oxalate anions $(COO)_2^{--}$ into the ammonium perchlorate crystal structure in place of the singly valent perchlorate anions $(ClO_4)^-$ so as to increase the thermal decomposition rate of the resulting crystals in comparison with pure ammonium perchlorate. The method of obtaining the substituted crystals and the method of measuring rate of thermal decomposition are identical to those described above in connection with Example 5. The results, as shown below, indicate the increase in thermal decomposition rate of the crystals obtained by this process as compared with pure ammonium perchlorate.

| Mole percent $(COO)_2^{--}$ | Temp. (° C.) for— | |
|---|---|---|
| | 50% decomposition | 100% decomposition |
| 0 | 408 | 447 |
| $10^{-1}$ | 404 | 439 |

Where the chemical reaction rate comprises thermal decomposition, the substituted ion should be thermally stable at the temperature of thermal decomposition of the original material.

While other methods of effecting the substitution of the desired ion into the lattice structure are of course possible and within the contemplation of our invention, the general procedure used in the preceding examples is a convenient one. When, in accordance with this procedure, the replacement ion forms part of a salt that is dissolved in a common solvent along with the original material, it is desirable to make sure that the other ion with which the replacement ion is combined to form the salt does not operate to destroy the effect created by the desired replacement. For instance, consider an original material comprised of univalent ions $A^+B^-$, with the reaction rate to be decreased by replacing the $A^+$ ion with $X^{++}$. If the $X^{++}$ ion is to be substituted by dissolving $A^+B^-$ and $X^{++}Y^{--}$ salts in a common solvent, then the resulting crystalline material might also have $Y^{--}$ ions substituted for $B^-$ ions, which would tend to vitiate or cancel out the decrease in reaction rate intended to be accomplished by substituting the $X^{++}$ divalent cation for $A^+$ univalent cation. Therefore, in performing a cation substitution by this method, it would be well either to use a salt of the form $X^{++}(Z^-)_2$, with a univalent anion coupled with the divalent cation, or, if a divalent anion $Y^{--}$ is to be used, make sure that it is not compatible with the $A^+B^-$ crystalline structure and therefore will not be substituted in the lattice for $B^-$ anions.

As the above description and examples make clear, we have discovered a new and powerful method for varying at will the chemical reaction rates of those solid materials having point defects, and new and useful materials formed by this process. Various modifications that will be obvious to those skilled in the art are within the contemplated scope of our invention, which is limited only by the appended claims.

We claim:

1. A process for increasing the rate of thermal decomposition of ammonium perchlorate comprising co-crystallizing with it a salt having $(COO)_2^{--}$ as an anion and having a singly valent cation.

2. The novel composition of matter comprising an ammonium perchlorate lattice having in ionic distribution therein about 0.001 to about 20 mole percent of $$(COO)_2^{--}$$

anions.

References Cited

UNITED STATES PATENTS

| 1,284,380 | 11/1918 | Le Sueur | 23—85 |
| 3,147,160 | 9/1964 | McCrone | 149—5 |
| 3,269,879 | 8/1966 | Stammler et al. | 149—2 |
| 2,190,703 | 2/1940 | Davis | 149—76 X |
| 3,172,793 | 3/1965 | Markowitz | 149—19 |

OTHER REFERENCES

Verneker et al.: J. Inorg. Nucl. Chem., vol. 29, pp. 2729–30 (1967).

CARL D. QUARFORTH, Primary Examiner

E. A. MILLER, Assistant Examiner

U.S. Cl. X.R.

23—85; 149—74, 75